Patented Sept. 12, 1950

2,521,673

UNITED STATES PATENT OFFICE 2,521,673

PREPARATION OF ORGANO-SILOXANE POLYMERS

Edgar C. Britton and Luther F. Berhenke, Midland, Mich., assignors to The Dow Chemical Company, Midland, Mich., a corporation of Delaware No Drawing. Application July 8, 1946, Serial No. 682,146

7 Claims. (Cl. 260—46.5)

This invention relates to an improved method for the preparation of organo-siloxane polymers from organo-halosilanes. It is particularly concerned with the preparation of distillable organo-siloxane polymers which contain halogen atoms attached directly to silicon atoms. Such halogen-containing organo-siloxane polymers may be, and in this invention are, employed in the production of complex resinous polymers of high molecular weight.

The organo-halosilanes which are the starting materials in this invention are compounds of silicon which contain one or more halogen atoms attached directly to the silicon atom. In general, these organo-halosilanes are compounds corresponding to the formula:

$$R_nSiX_{4-n}$$

in which R represents a hydrocarbon radical, X represents a halogen selected from the group consisting of chlorine and bromine, and $n$ is a whole number less than 4. Examples of suitable organo-halosilane starting materials include: methyl trichlorosilane, $CH_3SiCl_3$; methyl tribromosilane, $CH_3SiBr_3$; dimethyl dichlorosilane, $(CH_3)_2SiCl_2$; trimethyl bromosilane, $(CH_3)_3SiBr$; ethyl tribromosilane, $C_2H_5SiBr_3$; n-propyl trichlorosilane, $C_3H_7SiCl_3$; isopropyl trichlorosilane, $C_3H_7SiCl_3$; dibutyl dichlorosilane, $(C_4H_9)_2SiCl_2$; octyl trichlorosilane, $C_8H_{17}SiCl_3$; dodecyl tribromosilane, $C_{12}H_{25}SiBr_3$; di(octadecyl) dichlorosilane, $(C_{18}H_{37})_2SiCl_2$; methyl octadecyl dichlorosilane, $CH_3(C_{18}H_{37})SiCl_2$; triphenyl bromosilane, $(C_6H_5)_3SiBr$; phenyl methyl dichlorosilane, $C_6H_5(CH_3)SiCl_2$; tolyl trichlorosilane,

naphthyl trichlorosilane, $C_{10}H_7SiCl_3$; dibenzyl dichlorosilane, $[C_6H_5CH_2]_2SiCl_2$, etc., or mixtures thereof. The process is of particular advantage for the treatment of organo-halosilanes of the formula $RSiX_3$ wherein R and X have the meanings given above, and mixtures containing the latter compounds. It is also of particular advantage when the halosilane starting material contains a silicon tetrahalide.

Although methods are known for converting organo-halosilanes to organo-siloxane polymers, e. g. by hydrolysis and concurrent condensation of the hydrolysis products, such methods are not always satisfactory. For example, when the starting material contains a considerable proportion of an organo-trihalosilane, it can be hydrolyzed with water, but the rate of hydrolysis and degree of condensation of the hydrolysis products are difficult to control, and complex, highly-crosslinked organo siloxane polymers are frequently formed. Products of this sort are usually completely condensed and are quite resistant to further polymerization or increase in molecular size. Moreover, they are only difficultly soluble or dispersible in ordinary carriers, e. g. organic solvents, and so are limited in practical value.

It is also known to the art to conduct the hydrolysis of an organo-halosilane in the presence of an inert organic diluent, e. g. a hydrocarbon, ketone, etc., in order to slow up the rate of condesation of the hydrolysis products. In this manner soluble intermediate polymers may be prepared, containing residual hydroxyl groups, and utilizable as coatings, etc., by subsequent condensation of said hydroxyl groups. However, when the hydrolysis of an organo-polyhalosilane is conducted in this way, the by-produced hydrogen halide resists complete removal, even upon repeated washings with water. Residual hydrogen halide tends to catalyze the condensation of any hydroxyl groups present in the intermediate organo-siloxanes, and after standing for some time, e. g. overnight, such a solution will frequently contain gels and solids.

It is desirable, therefore, to provide an improved process for the conversion of organo-halosilanes to useful organo siloxane polymers, in which process the rate of condensation may be controlled, and in which by-products such as a hydrogen halide may be conveniently and substantially completely removed from the reaction mixture. It is an object of this invention to provide such a method.

We have found that tertiary alcohols may be reacted with organo-halosilanes to produce organo-siloxane polymers. Specifically, when an organo-halosilane is heated in contact with a substantially anhydrous tertiary alcohol, e. g. tertiary butyl alcohol, halogen atoms are replaced by oxygen atoms to form condensation products containing silicon-oxygen-silicon linkages. The halogen is converted to a tertiary alkyl halide together with a hydrogen halide If desired, the latter may be neutralized by additional alcohol to give tertiary alkyl halide and water. In some instances, other products, e. g. an alkene, may also be formed in minor amounts. These by-products are readily separated, e. g. by distillation, from the organo-siloxane product. The reaction is selective for halogen atoms attached directly to silicon atoms, and does not affect halogen present in organic portions of the starting material.

Apparently any tertiary alcohol is suitable for purposes of the invention, but in most instances tertiary butyl alcohol or tertiary amyl alcohol is preferred.

The optimum temperature of reaction varies, of course, with the starting materials, but in general it is advantageous to maintain the reaction mixture at approximately the reflux temperature of the alkyl halide which is formed. When tertiary butyl or tertiary amyl alcohol is employed, the optimum temperature usually lies within the range of from 50° to 120° C. or thereabouts.

The halosilane starting material, comprising an organo-halosilane, is treated with at least 0.5 gram molecular weight of alcohol per gram atomic weight of halogen to be removed therefrom and the mixture is heated at a reaction temperature. When the mixture is heated under reflux to a temperature sufficient to vaporize hydrogen halide as it is formed in the reaction, the minimum proportion of alcohol just stated is that theoretically required by the reaction. Due to the fact that vaporization of the hydrogen halide is seldom complete and that a portion of the hydrogen halide may react with the alcohol to form a tertiary alkyl halide, a somewhat larger proportion, e. g. 0.6 gram molecular weight or more, of alcohol, is usually employed per gram atomic weight of halogen to be removed from the halosilane. The alcohol is effective in removing halogen from a halosilane, regardless of the proportion in which it is employed. When all halogen of the halosilane is to be removed by treatment with the alcohol, the latter may be used in as large a proportion as desired, e. g. it may be used in four or more times the proportion theoretically required.

When the reaction between a halosilane and a tertiary aliphatic alcohol is carried out under conditions such that the hydrogen halide formed is retained in the mixture, e. g. when the reaction is carried out in a closed reactor or at a temperature below that at which the hydrogen halide is evolved, the proportion of alcohol theoretically required for removal of one gram atomic weight of halogen from a halosilane is one gram molecular weight of the alcohol. For instance, in such alcoholysis of a dialkyldihalosilane to produce a corresponding organo-siloxane which retains, in chemically combined form, approximately one atom of halogen per atom of silicon, one molecular equivalent of the alcohol is employed per mol of the dialkyldihalosilane starting material. When all halogen is to be removed from a halosilane, the alcohol may be used in as large an excess over the amount theoretically required as may be desired. In instances in which the alcoholysis is carried out without evolution of the hydrogen halide, the latter reacts with a portion of the alcohol to form a tertiary alkyl halide and water.

After completion of the alcoholysis reaction, the mixture is heated sufficiently to vaporize and remove its more volatile components such as hydrogen halide, a tertiary alkyl halide, water, etc. As residual material there are obtained siloxane polymers of fairly low molecular weight, e. g. they usually contain an average of between 2 and 20 silicon atoms in the molecule and may retain halogen. When the reaction has been conducted under conditions such as to produce siloxane polymers containing halogen atoms attached to silicon atoms, the product, or a mixture of such products, may be subjected to further hydrolysis and condensation to produce complex organo-siloxanes of much higher molecular weight. The low molecular weight condensation products obtained by the process of this invention, may also be further polymerized in accordance with known methods, e. g. by blowing with air at an elevated temperature, etc., to form complex condensation products of high molecular weight.

The following examples illustrate a satisfactory mode of applying the principle of our invention, but are not to be construed as limiting its scope:

*Example 1*

Into a three-necked flask fitted with a stirrer, dropping funnel, thermometer, and reflux condenser was placed 1.0 gram molecular weight of diethyl dichlorosilane. To this was added slowly 2.0 gram mols of tertiary butyl alcohol. During the addition, the temperature of the mixture rose to approximately 50° C. When the addition was complete, refluxing was continued for 1 hour. Subsequently, by-produced tertiary butyl chloride and water were removed by distillation, together with some unreacted tertiary butyl alcohol. The residual product consisted of a straw-colored oil having a viscosity of approximately 16 centipoises at 25° C. This oil was distilled and resolved into 4 portions, as shown in the following table:

| | Per Cent by Volume | Viscosity, Centipoises | Apparent Composition |
|---|---|---|---|
| 1 | 20 | 4.4 | hexaethyl cyclotrisiloxane. |
| 2 | 40 | 12.3 | octaethyl cyclotetrasiloxane. |
| 3 | 13 | 33.6 | decaethyl cyclopentasiloxane. |
| 4 | 23 | 160 | high-boiling polymers. |
| 5 | 4 | | mechanical loss. |

*Example 2*

By procedure similar to that described in Example 1, 2 gram mols of ethyl trichlorosilane and 1 gram mol of tertiary butyl alcohol were reacted at a temperature of from 50° to 60° C. After removal of tertiary butyl chloride and hydrogen chloride, the product consisted of an oil having a viscosity of 5600 centipoises at 25° C. Analysis of the oil showed a content of 22 per cent by weight of hydrolyzable chlorine. The average molecular weight was 1900, as determined by the lowering of freezing point in p-dichlorobenzene.

*Example 3*

The procedure of Example 1 was repeated, except that phenyl ethyl dichlorosilane was employed as the starting material. The resultant oil had a viscosity of 123 centipoises at 25° C., and comprised a mixture of phenyl ethyl siloxane polymers, of which 90 per cent by weight distilled below 280° C. at 0.05 millimeter absolute pressure.

For purposes of comparison, several portions of phenyl ethyl dichlorosilane were treated with excess water. Oily products were obtained which varied in composition, from 30 to 75 per cent by weight of the polymers being volatile below 280° C. at 0.05 millimeter.

*Example 4*

In a manner similar to that described in Example 1, 1.6 gram mols of tertiary amyl alcohol was added slowly and with stirring to 0.50 gram mol of ethyl phenyl dichlorosilane at a temperature of from 70° to 80° C. at which temperature tertiary amyl chloride refluxed. A single phase mixture was obtained which was subsequently distilled to remove tertiary amyl chloride and unreacted tertiary amyl alcohol. The residual oil had a viscosity of approximately 147 centipoises at 25° C.

Example 5

In this experiment, 1 gram molecular weight of phenyl trichlorosilane was added slowly and with stirring to 3.4 gram mols of tertiary butyl alcohol. The reaction mixture was refluxed for 1 hour at a temperature of from 48° to 49° C. Toward the end of the period of reflux, approximately 35 grams of water separated as a distinct layer. After removal of the water layer, the residual oil was heated to volatilize and remove tertiary butyl chloride and unreacted alcohol. There remained a resinous mass, brittle and tack-free at room temperature, which melted at from 60° to 70° C. to a viscous, slightly tacky, foamy syrup. A 50 per cent solution of the resin in toluene had a viscosity of approximately 6 centipoises.

Example 6

To a mixture of 163.5 grams (1 mol) of ethyl trichlorosilane and 205 grams (1 mol) of phenyl ethyl dichlorosilane was added 37 grams (0.5 mol) of tertiary butyl alcohol at a temperature of from 55° to 60° C. The reaction was carried out and the product was purified by procedure similar to that described in Example 1. There was obtained approximately 47.5 grams of an oil having a viscosity of 270 centipoises at 25° C. Analysis showed a chlorine content of 18.9 per cent by weight.

Example 7

By procedure similar to that described in Example 5, isopropyl trichlorosilane was reacted with tertiary butyl alcohol. A viscous oily product was obtained.

Example 8

Tertiary butyl alcohol was reacted with its molecular equivalent of ethyl trichlorosilane. Hydrogen chloride, in amount corresponding to four-tenths of the molecular equivalent of the ethyl trichlorosilane starting material, was vaporized from the mixture. There remained a liquid, chlorine-containing ethyl siloxane polymer. In a separate test, tertiary butyl alcohol was similarly reacted with 4 times its molecular equivalent of ethyl phenyl dichlorosilane, and hydrogen chloride was vaporized from the mixture to obtain a liquid, chlorine-containing ethyl phenyl siloxane polymer. The two liquid, chlorine-containing organo-siloxane polymers thus prepared were admixed in relative proportions such that the mixture contained phenyl and ethyl radicals in a ratio of 9:10. Tertiary butyl alcohol was then added in amount corresponding to 10.8 molecular equivalents thereof per mol of the ethyl trichlorosilane employed in forming the chlorine-containing ethyl-siloxane polymer component of the mixture. Upon adding the alcohol an alcoholysis reaction occurred. After completion of the reaction, the mixture was heated sufficiently to vaporize therefrom the volatile components such as hydrogen chloride, tertiary butyl alcohol and tertiary butyl chloride. There remained a liquid ethyl phenyl siloxane polymer having an absolute viscosity of 520 centipoises.

The process as described above may also be employed for the copolymerization of mixtures of more than two halosilane components, as well as for mixtures of organo-halosilanes with inorganic halosilanes such as silicon tetrachloride, silicon tetrabromide, etc.

The process just described permits production of intermediate siloxane polymers of more uniform structure and properties than can be obtained by the conventional methods of hydrolysis heretofore known.

Other modes of applying the principle of the invention may be employed instead of those explained, change being made as regards the compounds and materials herein disclosed, provided the steps stated by any of the following claims or equivalents of such steps be employed.

We therefore point out and distinctly claim:

1. The method of preparing an organo-siloxane polymer which comprises slowly adding substantially anhydrous tertiary butyl alcohol to hydrocarbon-chlorosilane, refluxing the mixture at a temperature of from 50° to 60° C. and separating the resultant organo-siloxane.

2. The method which comprises reacting a substantially anhydrous tertiary alcohol with a hydrolyzable hydrocarbon-halosilane, the ratio of tertiary alcohol to said hydrocarbon-halosilane being less than that theoretically necessary to remove completely all halogen atoms from the hydrocarbon-halosilane, and separating a resultant organo-siloxane polymer containing silicon atoms having halogen atoms attached thereto.

3. The method which comprises reacting substantially anhydrous tertiary butyl alcohol with a hydrolyzable hydrocarbon-halosilane, the ratio of tertiary butyl alcohol to said hydrocarbon-halosilane being less than that theoretically necessary to remove completely all halogen atoms from the hydrocarbon-halosilane, and separating a resultant organo-siloxane polymer which contains silicon atoms having halogen atoms attached thereto.

4. The method which comprises reacting substantially anhydrous tertiary butyl alcohol with a hydrolyzable hydrocarbon-halosilane, the ratio of tertiary butyl alcohol to said hydrocarbon-halosilane being less than that theoretically necessary to remove completely all halogen atoms from the hydrocarbon halosilane, separating a resultant liquid organo-siloxane polymer containing silicon atoms having halogen atoms attached thereto, and thereafter removing said residual halogen atoms to form a solid organo-siloxane polymer.

5. The method of preparing an organo-siloxane polymer which comprises admixing a substantially anhydrous tertiary alcohol with a hydrolyzable hydrocarbon-halosilane, and heating the mixture at a reaction temperature between 50° and 120° C.

6. A method, as described in claim 5, wherein the tertiary alcohol is tertiary amyl alcohol.

7. The method of preparing an organo-siloxane polymer which comprises admixing substantially anhydrous tertiary butyl alcohol with a hydrolyzable hydrocarbon chlorosilane having the formula $R_nSiCl_{4-n}$, wherein R is a monovalent hydrocarbon and $n$ is an integer from 1 to 3 inclusive, the number of mols of tertiary butyl alcohol being in excess of the number of equivalents of chlorine attached to silicon in the chlorosilane, reacting the above two compounds with the application of heat, and separating the resulting organo-siloxane polymer.

EDGAR C. BRITTON.
LUTHER F. BERHENKE.

REFERENCES CITED

The following references are of record in the file of this patent:

UNITED STATES PATENTS

| Number | Name | Date |
|---|---|---|
| 2,383,827 | Sprung | Aug. 28, 1945 |
| 2,398,672 | Sauer | Apr. 16, 1947 |

OTHER REFERENCES

Sommer et al.: J. Amer. Chem. Soc., vol. 68, June 1946, pp. 1083 to 1085.